United States Patent
Takahashi et al.

(10) Patent No.: US 11,657,382 B2
(45) Date of Patent: May 23, 2023

(54) DRIVE-THROUGH SYSTEM, VEHICLE, AND COMPUTER READABLE RECORDING MEDIUM

(71) Applicant: TOYOTA JIDOSHA KABUSHIKI KAISHA, Toyota (JP)

(72) Inventors: Yoshihiko Takahashi, Miyoshi (JP); Yuki Tatsumoto, Miyoshi (JP); Keisuke Nishinaka, Nagoya (JP); Hiroki Tamura, Shinagawa-ku (JP); Yoshitaka Nishikawa, Nagakute (JP); Kenji Gotoh, Minato-ku (JP); Kota Kato, Abiko (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 131 days.

(21) Appl. No.: 17/212,459

(22) Filed: Mar. 25, 2021

(65) Prior Publication Data
US 2021/0304182 A1    Sep. 30, 2021

(30) Foreign Application Priority Data
Mar. 27, 2020    (JP) .............................. JP2020-058016

(51) Int. Cl.
*G06Q 20/32*    (2012.01)
*G06Q 30/06*    (2023.01)
(Continued)

(52) U.S. Cl.
CPC ....... *G06Q 20/327* (2013.01); *G06Q 30/0633* (2013.01); *G06Q 30/0635* (2013.01); *G06K 19/06037* (2013.01)

(58) Field of Classification Search
None
See application file for complete search history.

(56) References Cited

U.S. PATENT DOCUMENTS

| 6,574,603 B1 * | 6/2003 | Dickson ............... G07C 5/0858 705/13 |
| 9,177,308 B2 * | 11/2015 | Grigg ................... G06Q 20/384 |

(Continued)

FOREIGN PATENT DOCUMENTS

| JP | 2010-061236 A |   | 3/2010 |
| JP | 2012-113576 A |   | 6/2012 |
| JP | 2013171397 A | * | 9/2013 |

OTHER PUBLICATIONS

Anon., "Meijer launches click-and-collect offer," M2 Presswire [Coventry] Apr. 16, 2015. (Year: 2015).*

(Continued)

*Primary Examiner* — Nicholas D Rosen
(74) *Attorney, Agent, or Firm* — Oliff PLC

(57) ABSTRACT

A drive-through system includes: a store terminal including a first processor; a vehicle including a second processor; and a user terminal device including a third processor. The second processor is configured to receive, from each occupant, operation to select a product to be purchased in a drive-through service, generate order information indicating the product selected by the occupant, and output the generated order information to the store terminal device. The first processor is configured to acquire the order information, generate, by using the acquired order information, settlement information for each occupant for performing settlement processing of the product, and output the generated settlement information to the vehicle. The second processor is further configured to acquire the settlement information, and display the settlement information of each occupant. The third processor is configured to execute the settlement processing of the product by using the settlement information of the occupant displayed.

9 Claims, 5 Drawing Sheets

(51) Int. Cl.
  *G06Q 30/0601* (2023.01)
  *G06K 19/06* (2006.01)

(56) References Cited

U.S. PATENT DOCUMENTS

| | | | | |
|---|---|---|---|---|
| 10,032,212 | B2* | 7/2018 | Winkelman | G06Q 20/4012 |
| 10,152,698 | B2* | 12/2018 | Li | G06Q 20/308 |
| 10,169,837 | B2* | 1/2019 | Wilson | G06Q 50/12 |
| 10,685,569 | B2* | 6/2020 | Nelson | H04L 67/52 |
| 2004/0117494 | A1* | 6/2004 | Mitchell | H04L 67/04 |
| | | | | 709/230 |
| 2008/0218313 | A1* | 9/2008 | d'Hont | G06Q 30/0603 |
| | | | | 340/286.09 |
| 2014/0006186 | A1* | 1/2014 | Grigg | G06Q 20/384 |
| | | | | 705/17 |
| 2015/0057872 | A1* | 2/2015 | Uchimura | H04M 1/72454 |
| | | | | 701/29.1 |
| 2015/0127493 | A1* | 5/2015 | Winkelman | G06Q 20/3224 |
| | | | | 705/26.81 |
| 2015/0142612 | A1* | 5/2015 | Hanna | G06Q 20/085 |
| | | | | 705/26.81 |
| 2015/0324890 | A1* | 11/2015 | Wilson | G06Q 30/0633 |
| | | | | 705/15 |
| 2015/0324936 | A1* | 11/2015 | Wilson | G06Q 30/0633 |
| | | | | 705/15 |
| 2016/0063459 | A1* | 3/2016 | Li | H04W 4/44 |
| | | | | 705/39 |
| 2019/0158646 | A1* | 5/2019 | Nelson | G06Q 20/321 |
| 2019/0279181 | A1* | 9/2019 | Kelly | G07F 9/023 |
| 2021/0209566 | A1* | 7/2021 | Ketharaju | G06Q 20/204 |

OTHER PUBLICATIONS

Maze, J., "Wendy's: Value deal drives 3Q sales," Nation's Restaurant News, Lebhar-Friedman, Inc.. (Nov. 4, 2015). (Year: 2015).*

Orem, T., "Payment Capabilities Coming to More Cars," Credit Union Times, ALM Media Properties, LLC (Jun. 27, 2019). (Year: 2019).*

Spar, Steven M., English Translation of JP 2010-061236-A, Translations Service Center, USPTO, translation dated Dec. 5, 2022. (Year: 2022).*

* cited by examiner

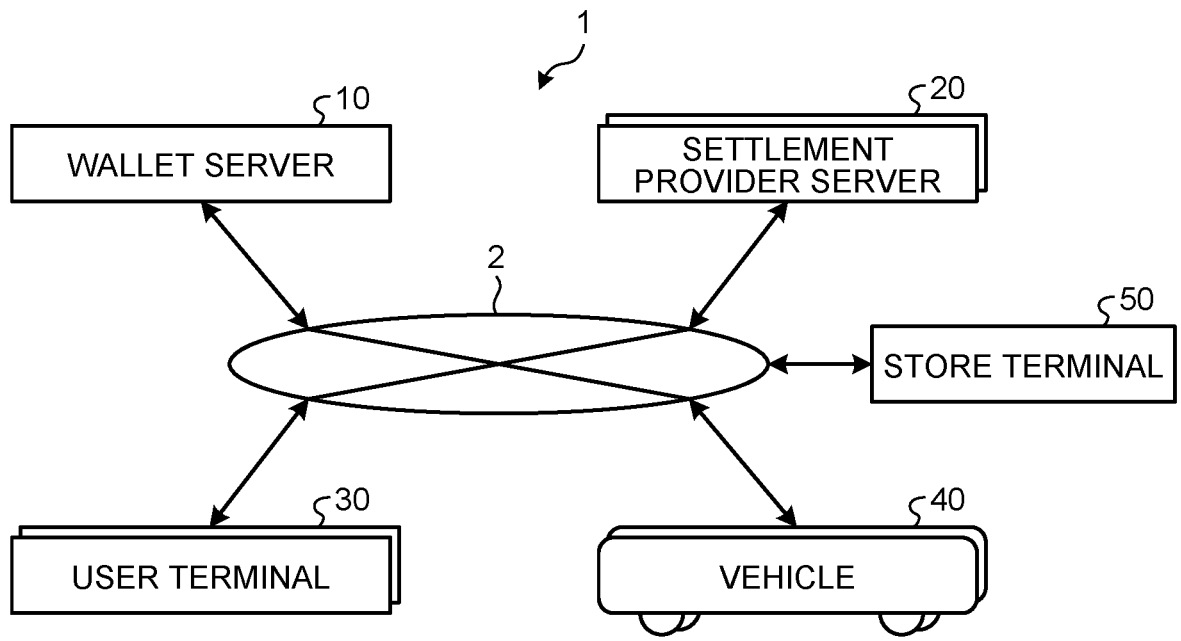
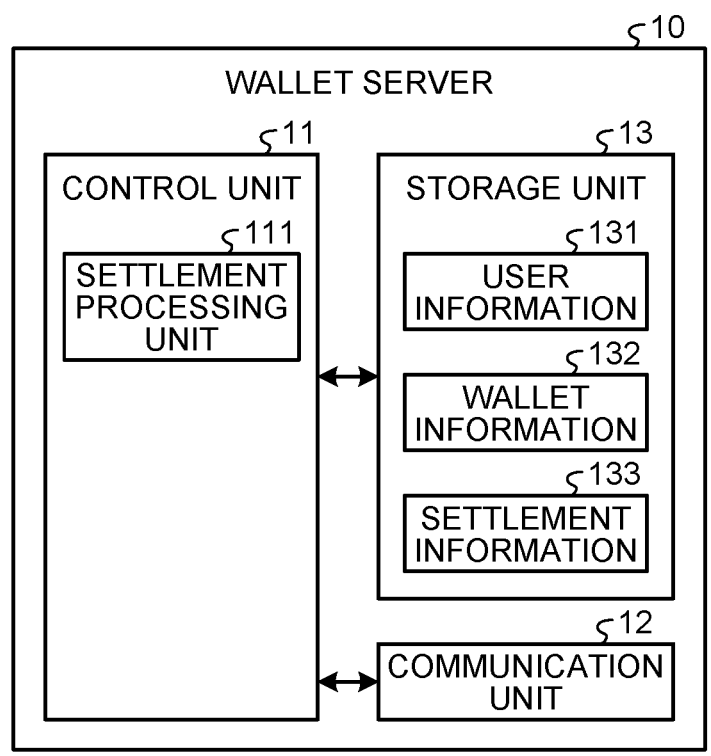

DRIVE-THROUGH SYSTEM, VEHICLE, AND COMPUTER READABLE RECORDING MEDIUM

The present application claims priority to and incorporates by reference the entire contents of Japanese Patent Application No. 2020-058016 filed in Japan on Mar. 27, 2020.

BACKGROUND

The present disclosure relates to a drive-through system, a vehicle, and a computer readable recording medium.

JP 2010-61236 A discloses an in-vehicle settlement system that performs settlement of a price for service provision while a driver is riding in a vehicle.

SUMMARY

There is a need for a drive-through system, a vehicle, and a computer readable recording medium that improve convenience of a settlement service in a drive-through.

According to one aspect of the present disclosure, there is provided a drive-through system including: a store terminal device provided in a store providing a drive-through service and including a first processor including hardware; a vehicle including a display, and a second processor including hardware; and a user terminal device that is carried by each of a plurality of occupants riding in the vehicle, the user terminal including a third processor including hardware, wherein the second processor is configured to receive, from each occupant, operation to select a product to be purchased in the drive-through service, generate order information indicating the product selected by the occupant, and output the generated order information to the store terminal device, the first processor is configured to acquire the order information, generate, by using the acquired order information, settlement information for each occupant for performing settlement processing of the product, and output the generated settlement information to the vehicle, the second processor is further configured to acquire the settlement information, and display the settlement information of each occupant on the display, and the third processor is configured to execute the settlement processing of the product by using the settlement information of the occupant displayed on the display.

BRIEF DESCRIPTION OF THE DRAWINGS

FIG. 1 is a schematic diagram illustrating a configuration of a drive-through system according to an embodiment;

FIG. 2 is a block diagram illustrating a configuration of a wallet server illustrated in FIG. 1;

DETAILED DESCRIPTION

Figure 3:
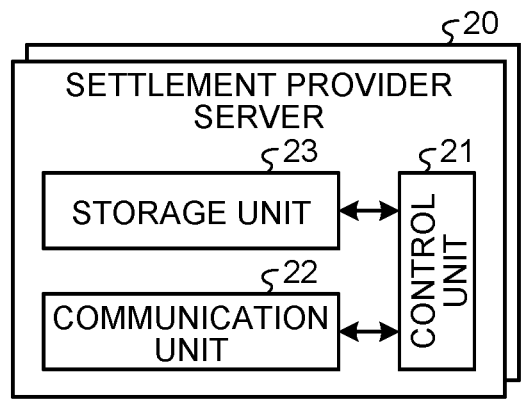
FIG. 3 is a block diagram illustrating a configuration of a settlement provider server illustrated in FIG. 1.

Hereinafter, a drive-through system according to an embodiment will be described with reference to the drawings.

First, a configuration of a drive-through system according to an embodiment will be described with reference to FIGS. 1 to 7.

As illustrated in FIG. 1, a drive-through system 1 according to an embodiment includes a wallet server 10, a settlement provider server 20, a user terminal 30, a vehicle 40, and a store terminal 50 that may perform information communication with each other via a network 2.

The network 2 includes an Internet line network, a mobile phone line network, and the like. The network 2 is, for example, a public communication network such as the Internet, and may include other communication networks such as a wide area network (WAN), a telephone communication network for a mobile phone and the like, and a wireless communication network such as WiFi (registered trademark).

As illustrated in FIG. 2, the wallet server 10 includes a control unit 11, a communication unit 12, and a storage unit 13.

The control unit 11 includes a processor having hardware, such as a central processing unit (CPU), a digital signal processor (DSP), and a field-programmable gate array (FPGA), and a main storage unit such as a random access memory (RAN) and a read only memory (ROM). The control unit 11 loads a computer program stored in the storage unit 13 in a work area of the main storage unit, executes the computer program, and controls each component or the like through the execution of the computer program, thereby implementing a function matching a predetermined purpose. In the present embodiment, the control unit 11 functions as a settlement processing unit 111 by executing the computer program. A function of the settlement processing unit 111 will be described later.

The communication unit 12 includes, for example, a local area network (LAN) interface board and a wireless communication circuit for wireless communication. The LAN interface board and the wireless communication circuit are connected to the network 2 such as the Internet serving as a public communication network. The communication unit 12 is connected to the network 2 and performs information communication with the settlement provider server 20, the user terminal 30, the vehicle 40, and the store terminal 50 via the network 2.

The storage unit 13 includes a recording medium such as an erasable programmable ROM (EPROM), a hard disk drive (HDD), and a removable medium. Examples of the removable medium include a disc recording medium such as a universal serial bus (USB) memory, a compact disc (CD), a digital versatile disc (DVD), and a Blu-ray (registered trademark) disc (BD). The storage unit 13 may store an operating system (OS), various programs, various tables, various databases, and the like. In the present embodiment, the storage unit 13 stores user information 131, wallet information 132, and settlement information 133 for each user who performs a settlement procedure.

The user information 131 is information regarding a user who performs a settlement procedure. Examples of the user information 131 includes a user ID of the user who performs the settlement procedure, a password, a name of the user, contact information (for example, address, phone number, and email address) of the user, a use registration history, information regarding a payment method registered as a depositing method, information regarding a payment method registered as a settlement method, and a personal identification number at the time of settlement. In the user information 131, the user ID and the password are used for authentication processing such as login to the wallet server 10.

The wallet information 132 is information regarding a wallet. The wallet indicates a virtual deposit/withdrawal account of electronic money. Examples of the wallet information 132 include a user ID, a balance of electronic money, a deposit history of electronic money, and a use history of electronic money.

The settlement information 133 is information regarding settlement of a user. Examples of the settlement information 133 include a user ID, a settlement method used for the settlement (for example, electronic money payment (contactless payment), scan payment, and code payment), and settlement history.

The settlement provider server 20 is a server for managing an account and a credit card of a user, and is provided in financial institutions (for example, banks, credit unions, credit associations, and labor banks) and credit card companies. As illustrated in FIG. 3, the settlement provider server 20 includes a control unit 21, a communication unit 22, and a storage unit 23. The control unit 21, the communication unit 22, and the storage unit 23 have physically similar configurations to the control unit 11, the communication unit 12, and the storage unit 13, respectively.

The storage unit 23 stores account information and credit card information for each user who performs a settlement procedure. Examples of the account information include a name of the user, an account number, an account balance, and a deposit/withdrawal history. In addition, examples of the credit card information include a name of the user, a credit card number, an expiration date of the credit card, use limit amount, and a card use history.

The user terminal 30 is a computer terminal used by a user. Examples of the user terminal 30 include a smartphone, a mobile phone, a tablet terminal, a wearable computer, a personal computer, and a route guidance device mounted on a vehicle, which are owned by a user. The user terminal 30 may be any terminal as long as information communication with the wallet server 10 and the vehicle 40 may be performed.

Figure 4:
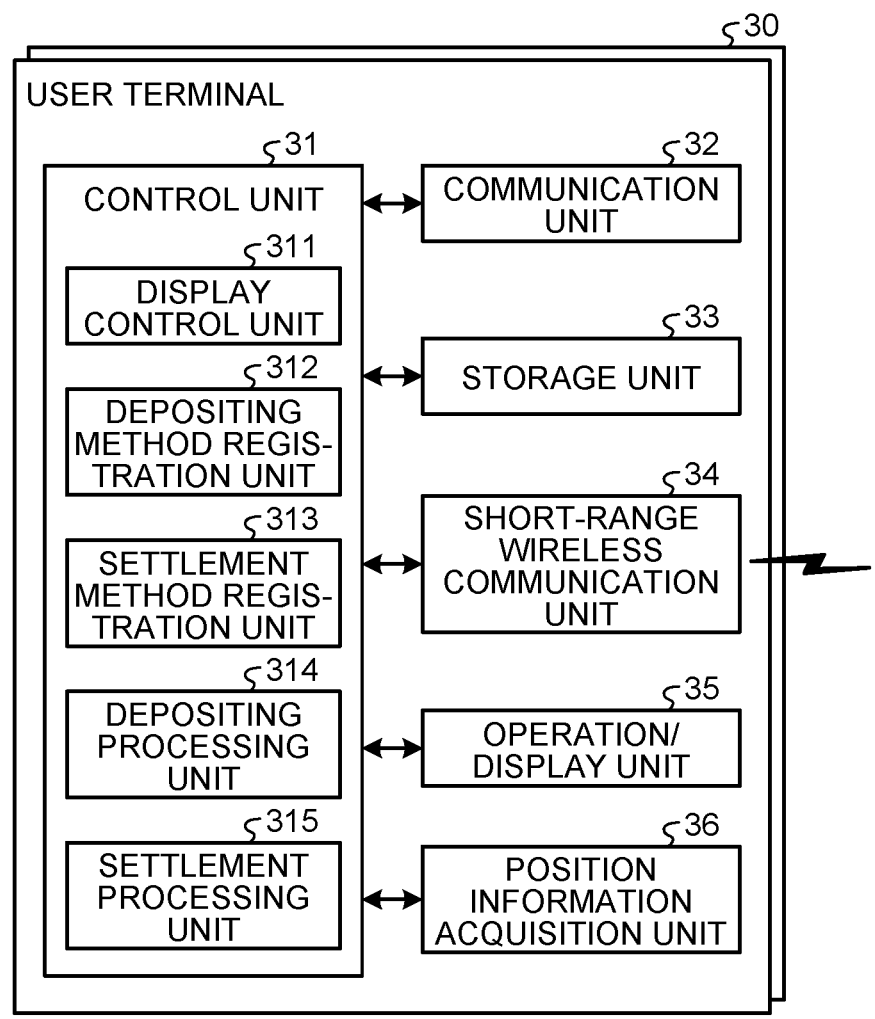
FIG. 4 is a block diagram illustrating a configuration of a user terminal illustrated in FIG. 1.

As illustrated in FIG. 4, the user terminal 30 includes a control unit 31, a communication unit 32, a storage unit 33, a short-range wireless communication unit 34, an operation/display unit 35, and a position information acquisition unit 36. The control unit 31, the communication unit 32, and the storage unit 33 have physically similar configurations to the control unit 11, the communication unit 12, and the storage unit 13, respectively. The control unit 31 functions as a display control unit 311, a depositing method registration unit 312, a settlement method registration unit 313, a depositing processing unit 314, and a settlement processing unit 315 through execution of a computer program.

The display control unit 311 controls display contents on the operation/display unit 35. On the basis of operation of a user (touch operation, flick operation, and the like), the display control unit 311 displays, on the operation/display unit 35, a member registration screen for the user to register as a member, a login screen for the user to log in to the wallet server 10, a depositing screen for the user to deposit electronic money into the wallet, a settlement screen for the user to perform settlement, a use history screen showing a list of use histories of settlement and the like, a payment history detail screen showing details of payment history, a code payment screen, a scan payment screen, and the like. The display control unit 311 also performs transition of each screen on the basis of operation of the user. Note that various configurations may be adopted for screen configurations of the settlement screen, the use history screen, the payment history detail screen, and the code payment screen.

The depositing method registration unit 312 registers a depositing method for depositing electronic money. Specifically, the depositing method registration unit 312 transmits, to the wallet server 10, a depositing method registration request for registering a plurality of different payment methods (for example, a bank account, a credit card, and a virtual credit card) operated by a plurality of companies as depositing methods into the wallet. When receiving the depositing method registration request from the depositing method registration unit 312, the control unit 11 of the wallet server 10 stores, in the storage unit 13, the payment methods included in the depositing method registration request as the user information 131 to register the payment methods as the depositing methods.

The depositing method registration unit 312 registers the payment method to be registered as the settlement method also as the depositing method. That is, when a settlement method registration request is transmitted from the settlement method registration unit 313 to the wallet server 10, the depositing method registration unit 312 transmits, to the wallet server 10, the depositing method registration request for registering the payment methods included in the settlement method registration request as the settlement methods. When receiving the depositing method registration request from the depositing method registration unit 312, the control unit 11 of the wallet server 10 stores, in the storage unit 13, the payment methods included in the depositing method registration request as the user information 131 to register the payment methods as the depositing methods.

Figure 5:
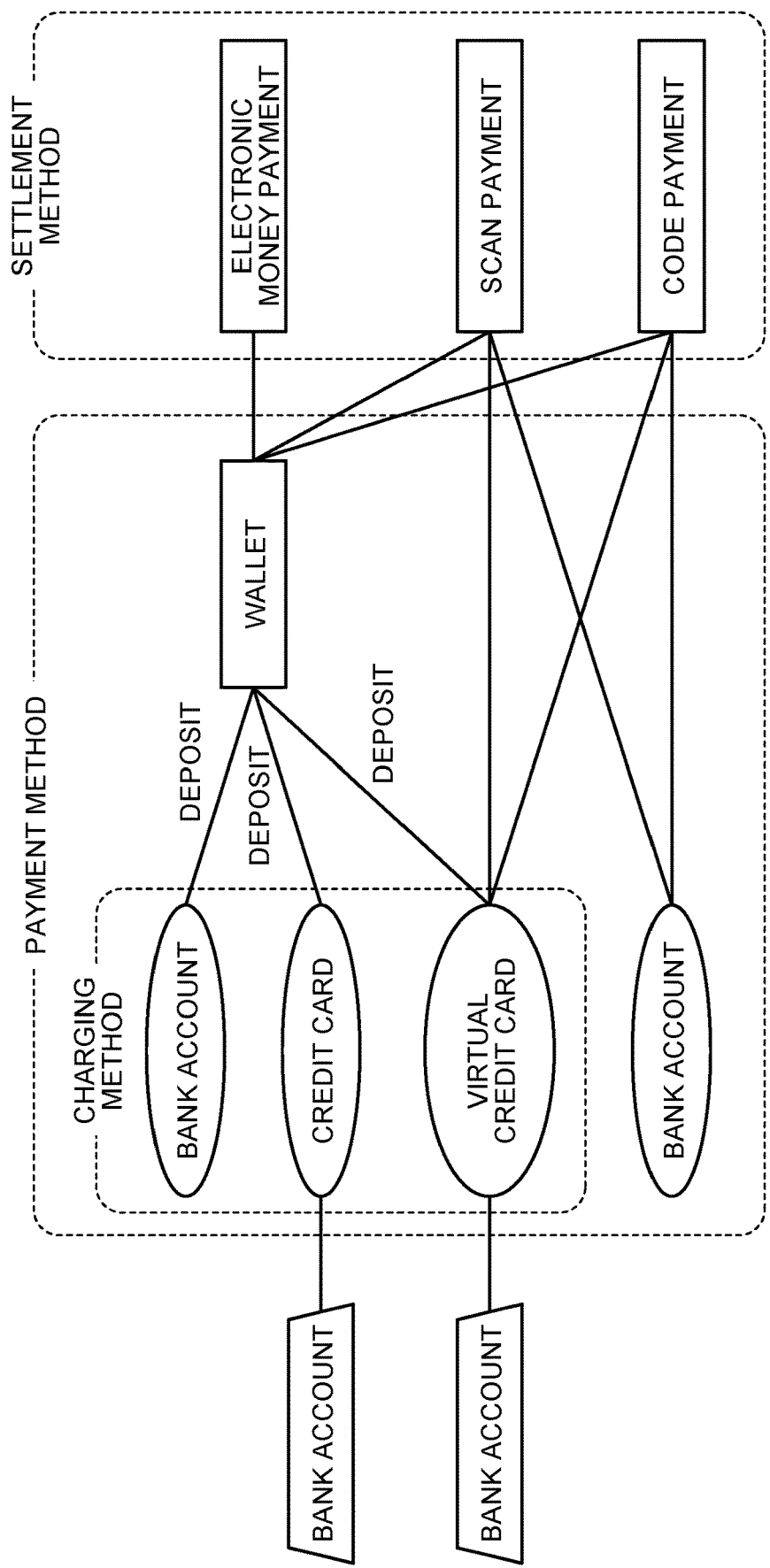
FIG. 5 is a diagram illustrating a relationship between a wallet and a settlement method.

FIG. 5 is a diagram schematically illustrating a relationship among the payment method, the depositing method, and the settlement method. The "payment method" refers to a method that serves as funds for payment (funding source) when settlement is performed. Examples of the payment method include a bank account, a credit card, a virtual credit card, and a balance of electronic money in the wallet. The virtual credit card is an insubstantial credit card, and includes, for example, information such as a card number, an expiration date, and an authentication number (security code). In addition, a bank account is associated with each of the credit card and the virtual credit card, and a use amount of each card is withdrawn from the bank account at a later date.

The "depositing method" refers to a method for depositing electronic money into the wallet serving as a virtual deposit/withdrawal account. Examples of the depositing method include the bank account, the credit card, and the virtual credit card among the payment methods. By registration of the bank account, the credit card, and the virtual credit card as the depositing methods, it becomes possible to deposit electronic money into the wallet.

The "settlement method" refers to a method of performing settlement by using the payment method. Examples of the settlement method include electronic money payment, scan payment, and code payment. The electronic money payment is settlement performed in a contactless manner between the short-range wireless communication unit 34 of the user terminal 30 and a short-range wireless communication unit 46 of the vehicle 40 by holding the user terminal 30 over a predetermined position of the vehicle 40. The scan payment is settlement performed by reading a barcode or QR code (registered trademark) displayed on the vehicle 40 with a camera or the like of the user terminal 30. The code payment is settlement performed by reading a barcode or QR code (registered trademark) displayed on the user terminal 30 with a code reader or the like of the vehicle 40.

In the drive-through system 1, any of the three types of the settlement method may be used by using the three types of the payment method. That is, in the drive-through system 1, the payment method and the settlement method may be combined as described in (1) to (3) below.

(1) Electronic money payment, scan payment, and code payment using a balance of electronic money in the wallet.

(2) Electronic money payment, scan payment, and code payment using a virtual credit card.

(3) Electronic money payment, scan payment, and code payment using a bank account.

In the drive-through system 1 of the present embodiment, electronic money may be deposited into the wallet by the plurality of payment methods, and a balance of electronic money deposited in the wallet may be settled through the plurality of settlement methods.

Return to FIG. 4. The settlement method registration unit 313 registers the payment method to be registered as the depositing method also as the settlement method. That is, when the depositing method registration request is transmitted from the depositing method registration unit 312 to the wallet server 10, the settlement method registration unit 313 transmits, to the wallet server 10, a settlement method registration request for registering the payment methods included in the depositing method registration request as the settlement methods.

For example, when registering a certain payment method (bank account of A bank) as the depositing method, the settlement method registration unit 313 automatically registers the payment method (bank account of A bank) also as the settlement method. Note that "register the payment method as the settlement method" means enabling settlement using the payment method as a payment source, for example, enabling electronic money payment, scan payment, and code payment using the bank account of the A bank as a payment source. When receiving the settlement method registration request from the settlement method registration unit 313, the control unit 11 of the wallet server 10 stores, in the storage unit 13, the payment methods included in the settlement method registration request as the user information 131 to register the payment methods as the settlement methods.

The depositing processing unit 314 deposits electronic money into the wallet. Specifically, the depositing processing unit 314 transmits, to the wallet server 10, a depositing request for depositing electronic money into the wallet by the payment method registered as the depositing method. When receiving the depositing request from the depositing processing unit 314, the control unit 11 of the wallet server 10 increases a balance of electronic money in the wallet on the basis of deposit amount information included in the depositing request. That is, the control unit 11 updates the wallet information 132 stored in the storage unit 13 in accordance with the increase in the balance of the electronic money in the wallet.

The settlement processing unit 315 performs settlement by the payment method. The settlement processing unit 315 transmits, to the vehicle 40 on which a user is riding, a settlement request for performing settlement by electronic money deposited into the wallet by using one of the plurality of settlement methods (electronic money payment, scan payment, and code payment) set in advance. For example, when electronic money payment is performed, the settlement processing unit 315 transmits the settlement request to the vehicle 40 through the short-range wireless communication unit 34. In addition, when scan payment is performed, the settlement processing unit 315 transmits the settlement request to the vehicle 40 by reading a barcode or QR code (registered trademark) displayed on the vehicle 40 with the camera or the like of the user terminal 30. In addition, when code payment is performed, the settlement processing unit 315 transmits the settlement request to the vehicle 40 by reading a barcode or QR code (registered trademark) displayed on the user terminal 30 with the code reader or the like of the vehicle 40. Note that the settlement request transmitted from the settlement processing unit 315 to the vehicle 40 may or may not include information indicating a settlement amount (hereinafter referred to as "settlement amount information").

Subsequently, a control unit 41 of the vehicle 40 transmits the settlement request including the settlement amount information to the wallet server 10 via the network 2. When receiving the settlement request from the vehicle 40, the settlement processing unit 111 of the wallet server 10 decreases a balance of electronic money in the wallet on the basis of the settlement amount information included in the settlement request. That is, the settlement processing unit 111 updates the wallet information 132 and the settlement information 133 stored in the storage unit 13 in accordance with the decrease in the balance of the electronic money in the wallet.

Note that the settlement processing unit 315 may also perform settlement by the payment method other than the balance of the electronic money in the wallet (for example, a bank account or a credit card). In this case, the settlement processing unit 315 transmits, to the wallet server 10, a settlement request for performing settlement by a bank account or a credit card by using one of the plurality of settlement methods. When receiving the settlement request from the settlement processing unit 315, the settlement processing unit 111 of the wallet server 10 transmits the settlement amount information included in the settlement request to the settlement provider server 20.

The storage unit 33 stores data of various screens to be displayed by the display control unit 311 on the operation/display unit 35. In addition, the storage unit 33 continuously or temporarily stores the user information 131, the wallet information 132, the settlement information 133, and the like, as needed.

The short-range wireless communication unit 34 has a communication function conforming to a standard such as near field radio communication (NFC), Bluetooth (registered trademark) low energy (BLE), or Infrared Data Association (IrDA), for example. For example, when performing electronic money payment, the user terminal 30 performs short-range wireless communication with the vehicle 40 through the short-range wireless communication units 34 and 46.

The operation/display unit 35 includes a touch panel display, for example, and has an input function for accepting operation by a finger of a user, a pen, or the like, and a display function for displaying various types of information under control of the display control unit 311.

The position information acquisition unit 36 receives, for example, radio waves from a global positioning system (GPS) satellite and detects a position of the user terminal 30. Information regarding the position of the user terminal 30 detected by the position information acquisition unit 36 is stored in the storage unit 33.

Figure 6:
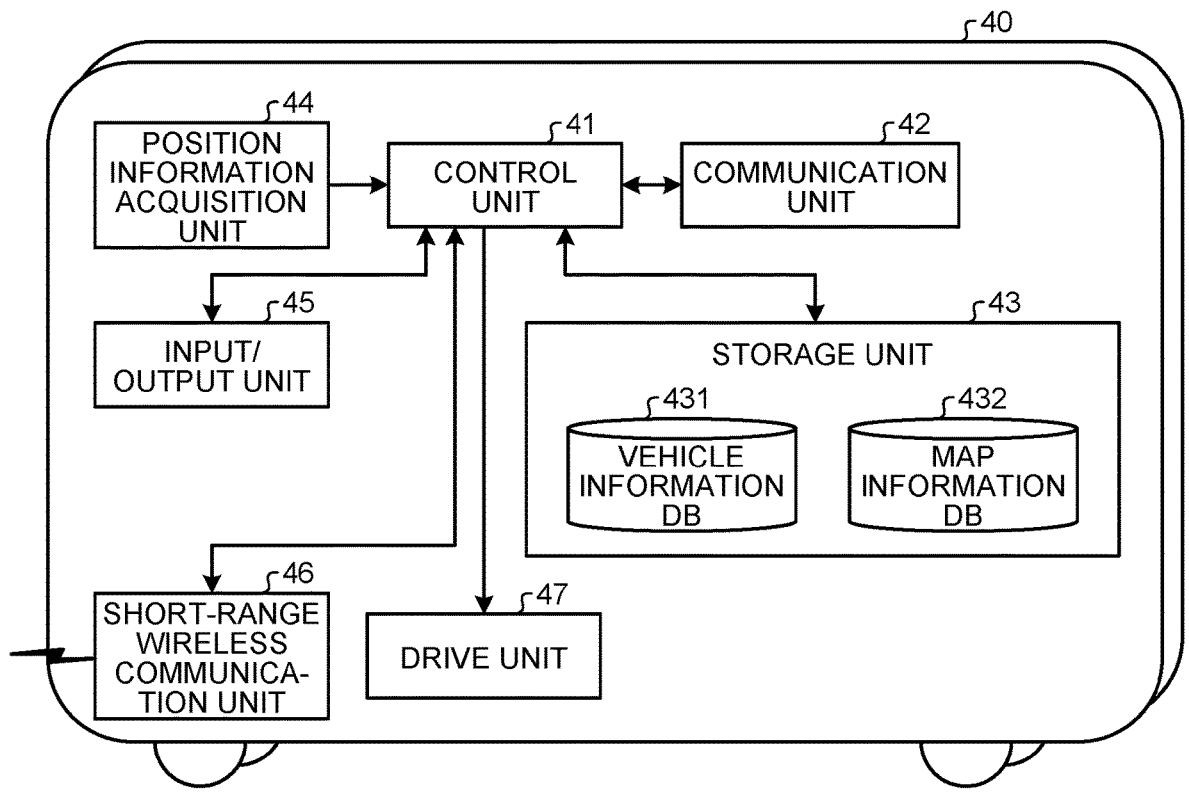
FIG. 6 is a block diagram illustrating a configuration of a vehicle illustrated in FIG. 1.
Figure 7:
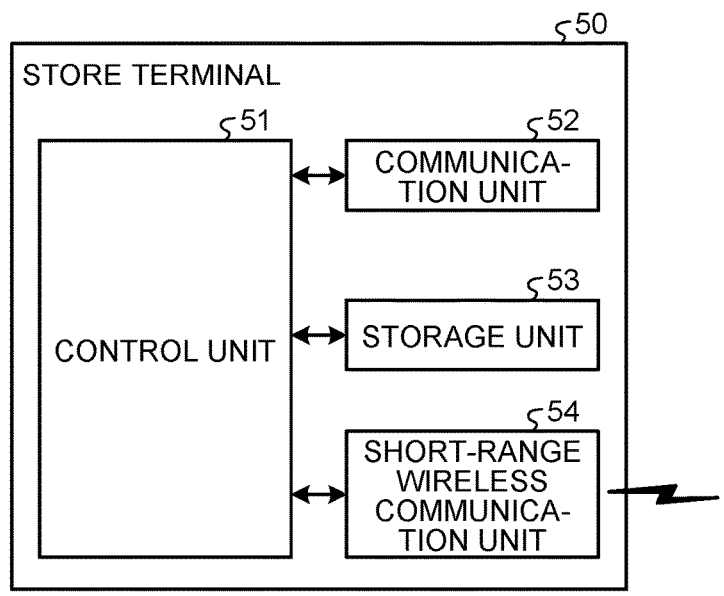
FIG. 7 is a block diagram illustrating a configuration of a store terminal illustrated in FIG. 1.

The vehicle 40 is a vehicle that travels by driving by a driver, or an autonomous traveling vehicle capable of autonomous traveling in accordance with a given traveling command. As illustrated in FIG. 6, the vehicle 40 includes the control unit 41, a communication unit 42, a storage unit 43, a position information acquisition unit 44, an input/output unit 45, the short-range wireless communication unit 46, and a drive unit 47.

The control unit 41, the communication unit 42, the storage unit 43, and the short-range wireless communication unit 46 have physically similar configurations to the control unit 11, the communication unit 12, the storage unit 13, and the short-range wireless communication unit 34, respectively.

The control unit 41 comprehensively controls operation of various components mounted on the vehicle 40.

The communication unit 42 includes a data communication module (DCM) that performs information communication with the wallet server 10 by wireless communication via the network 2.

The storage unit 43 includes a vehicle information database (vehicle information DB) 431 and a map information database (map information DB) 432. The vehicle information database 431 stores, in an updatable manner, various types of information including a vehicle ID of the vehicle 40, a user ID of a driver of the vehicle 40, a SOC of a battery mounted on the vehicle 40, a fuel remaining amount of the vehicle 40, travel route information of the vehicle 40, and vehicle type information of the vehicle 40.

The map information DB 432 stores map information. Here, the map information is information necessary for specifying positions of a road, a road structure, a facility, and the like, and includes, for example, data related to each node set on the road (for example, a node ID and coordinates), data related to each link set on the road (for example, a link ID, a link name, a connection node ID, road coordinates, a road type (a toll road, a general road, and the like), and the number of lanes), and feature data (for example, a traffic signal, a road sign, a guardrail, and a facility).

The position information acquisition unit 44 has a physically similar configuration to the position information acquisition unit 36. Position information of the vehicle 40 detected by the position information acquisition unit 44 is stored in the vehicle information database 431 in a retrievable manner. Note that, as a method of detecting a position of the vehicle 40, a method combining light detection and ranging or laser imaging detection and ranging (LiDAR) and a three-dimensional digital map may be adopted.

The input/output unit 45 includes a touch panel display and a speaker microphone. The input/output unit 45 as an output unit may notify the outside of predetermined information by displaying characters, graphics, and the like on a screen of the touch panel display or outputting sound from the speaker microphone, under control of the control unit 41. In addition, the input/output unit 45 as an input unit may input predetermined information to the control unit 41 by a user or the like operating the touch panel display or generating sound toward the speaker microphone. Note that, although the vehicle 40 includes the position information acquisition unit 44 and the input/output unit 45 as separate functions in the present embodiment, the vehicle 40 may include, instead of the position information acquisition unit 44 and the input/output unit 45, an in-vehicle navigation system with a communication function having functions of the position information acquisition unit 44 and the input/output unit 45.

The short-range wireless communication unit 46 has a communication function conforming to a standard such as NFC, BLE, or IrDA, for example, and is provided at a predetermined position of the vehicle 40. When a user, for example, performs electronic money payment, by holding the user terminal 30 over a predetermined position, short-range wireless communication is executed through the short-range wireless communication unit 46 with the user terminal 30 and the store terminal 50.

The drive unit 47 is a drive unit that performs driving necessary for traveling of the vehicle 40. Specifically, the vehicle 40 includes an engine as a drive source, and the engine may generate power by using an electric motor or the like by being driven by combustion of fuel. The generated power is charged into a rechargeable battery. The vehicle 40 also includes a drive transmission mechanism that transmits driving force of the engine, driving wheels for traveling, and the like.

The store terminal 50 is an information processing device provided in a store providing a drive-through service, and includes a control unit 51, a communication unit 52, a storage unit 53, and a short-range wireless communication unit 54. The control unit 51, the communication unit 52, the storage unit 53, and the short-range wireless communication unit 54 have physically similar configurations to the control unit 11, the communication unit 12, the storage unit 13, and the short-range wireless communication unit 34, respectively.

The control unit 51 comprehensively controls operation of various components of the store terminal 50.

The communication unit 52 includes a DCM that performs information communication with the wallet server 10 by wireless communication via the network 2.

The storage unit 53 stores an operating system, various programs, various tables, various databases, and the like. In the present embodiment, the storage unit 53 stores data of a menu of products that may be purchased in the drive-through service.

The short-range wireless communication unit 54 has a communication function conforming to a standard such as NFC, BLE, or IrDA, for example, and executes short-range wireless communication with the vehicle 40.

The drive-through system 1 having such configurations improves convenience of a settlement service in a drive-through by executing the following order processing. Hereinafter, operation of the drive-through system 1 when executing order processing according to first and second embodiments will be described with reference to FIGS. 8 and 9.

Figure 8:
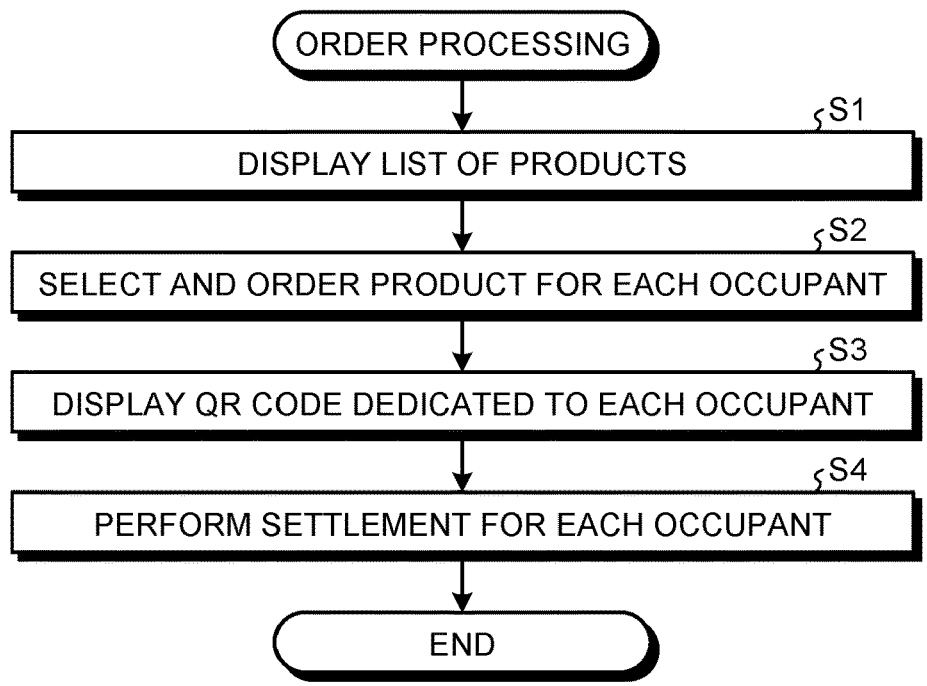
FIG. 8 is a flowchart illustrating a flow of order processing according to a first embodiment.

FIG. 8 is a timing chart illustrating a flow of the order processing according to the first embodiment. The timing chart illustrated in FIG. 8 starts at a timing when the vehicle 40 enters a range where information communication with the communication unit 52 of the store terminal 50 is possible, and the order processing proceeds to processing of Step S1.

In the processing of Step S1, the control unit 51 of the store terminal 50 reads, from the storage unit 53, data of a menu of products that may be purchased in the drive-through service, and transmits, via the communication unit 52, the read data to the vehicle 40. The control unit 41 of the vehicle 40 receives the data of the menu of the products via the communication unit 42, and, by using the received data, displays, on the input/output unit 45, a list of the products that may be purchased in the drive-through service. Thus, the processing of Step S1 is completed, and the order processing proceeds to processing of Step S2.

In the processing of Step S2, the control unit 41 of the vehicle 40 receives, from each of a plurality of occupants riding in the vehicle 40, operation by using the input/output unit 45 to select a product to be purchased, and transmits, via the communication unit 42, information regarding the product selected by the occupant as order information for each occupant to the store terminal 50. Note that, when selecting a product to be purchased, an occupant inputs information such as a user ID for specifying the occupant, and the order information includes the information for specifying the user together with the information regarding the selected product. Thus, the processing of Step S2 is completed, and the order processing proceeds to processing of Step S3.

In the processing of Step S3, the control unit 51 of the store terminal 50 receives the order information of each occupant via the communication unit 52, and generates, by using the received order information, settlement information for each occupant for performing settlement of the selected product. Here, the settlement information includes information for specifying a user, a settlement amount, and QR code (registered trademark) dedicated to a settlement procedure. Note that a two-dimensional code other than the QR code (registered trademark) may be used, or a barcode may be used instead of the two-dimensional code. The control unit 51 then transmits the settlement information of each occupant to the vehicle 40 via the communication unit 52. The control unit 41 of the vehicle 40 receives the settlement information of each occupant via the communication unit 42, and displays the received settlement information on the input/output unit 45 for each occupant. Thus, the processing of Step S3 is completed, and the order processing proceeds to processing of Step S4.

In the processing of Step S4, in accordance with the settlement information displayed on the input/output unit 45, each occupant performs settlement processing with the wallet server 10 by using the user terminal 30 which the occupant carries. When the settlement processing is completed, the wallet server 10 notifies the store terminal 50 that the settlement processing is completed, and the store providing the drive-through service provides the product ordered by the occupant. Note that settlement of the settlement amount of the occupant may be performed by another user who is not riding in the vehicle 40. In addition, the settlement processing may be executed by using an amount deposited in advance by another user. Thus, the processing of Step S4 is completed, and a series of the order processing ends.

Figure 9:
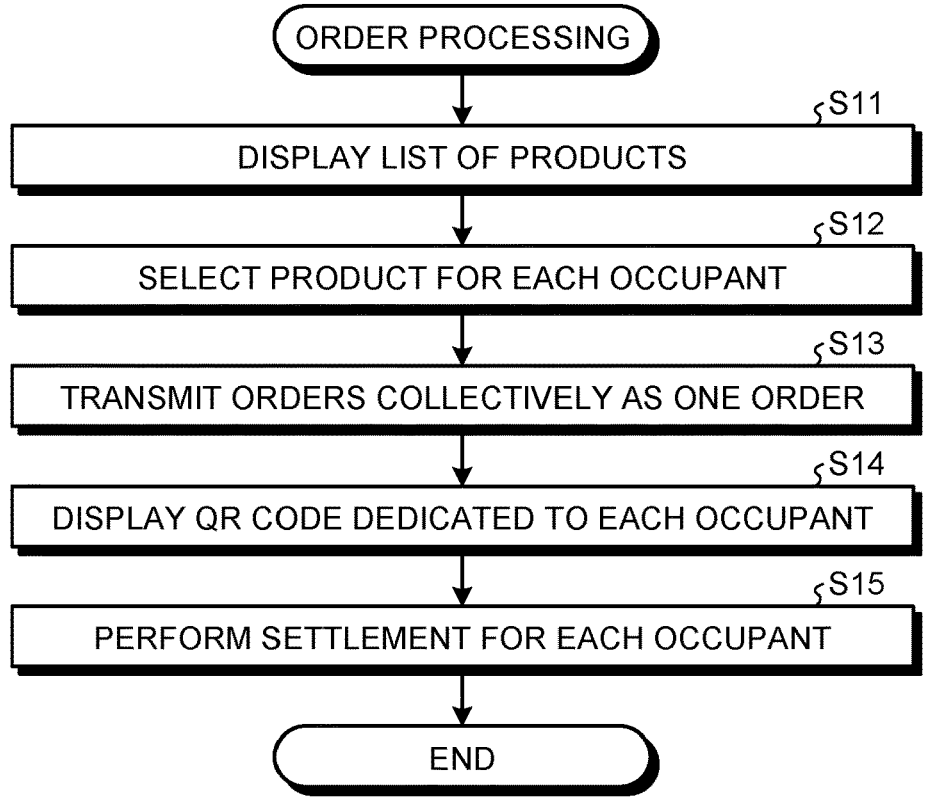
FIG. 9 is a flowchart illustrating a flow of order processing according to a second embodiment.

FIG. 9 is a timing chart illustrating a flow of the order processing according to the second embodiment. The timing chart illustrated in FIG. 9 starts at a timing when the vehicle 40 enters a range where information communication with the communication unit 52 of the store terminal 50 is possible, and the order processing proceeds to processing of Step S11.

In the processing of Step S11, the control unit 51 of the store terminal 50 reads, from the storage unit 53, data of a menu of products that may be purchased in the drive-through service, and transmits, via the communication unit 52, the read data to the vehicle 40. The control unit 41 of the vehicle 40 receives the data of the menu of the products via the communication unit 42, and, by using the received data, displays, on the input/output unit 45, a list of the products that may be purchased in the drive-through service. Thus, the processing of Step S11 is completed, and the order processing proceeds to processing of Step S12.

In the processing of Step S12, the control unit 41 of the vehicle 40 receives, from each of a plurality of occupants riding in the vehicle 40, operation by using the input/output unit 45 to select a product to be purchased. Thus, the processing of Step S12 is completed, and the order processing proceeds to processing of Step S13.

In the processing of Step S13, the control unit 41 of the vehicle 40 transmits, via the communication unit 42, information regarding the products selected by the occupants collectively to the store terminal 50 as order information. Note that, when selecting a product to be purchased, an occupant inputs information such as a user ID for specifying the occupant, and the order information includes the information for specifying the user together with the information regarding the selected product. Alternatively, the control unit 41 of the vehicle 40 may transmit the order information for each occupant, and the store terminal 50 may collect the order information of the occupants in the same vehicle 40. Whether the occupants are in the same vehicle 40 may be determined by, for example, comparing position information of the vehicle 40 with position information of the user terminals 30 carried by the occupants. Thus, the processing of Step S13 is completed, and the order processing proceeds to processing of Step S14.

In the processing of Step S14, the control unit 51 of the store terminal 50 receives the order information via the communication unit 52, and generates, by using the received order information, settlement information for each occupant for performing settlement of the selected product. Here, the settlement information includes information for specifying a user, a settlement amount, and QR code (registered trademark) dedicated to a settlement procedure. Note that a two-dimensional code other than the QR code (registered trademark) may be used, or a barcode may be used instead of the two-dimensional code. The control unit 51 then transmits the settlement information of each occupant to the vehicle 40 via the communication unit 52. The control unit 41 of the vehicle 40 receives the settlement information of each occupant via the communication unit 42, and displays the received settlement information on the input/output unit 45 for each occupant. Thus, the processing of Step S14 is completed, and the order processing proceeds to processing of Step S15.

In the processing of Step S15, in accordance with the settlement information displayed on the input/output unit 45, each occupant performs settlement processing with the wallet server 10 by using the user terminal 30 which the occupant carries. When the settlement processing is completed, the wallet server 10 notifies the store terminal 50 that the settlement processing is completed, and the store providing the drive-through service provides the product ordered by the occupant. Thus, the processing of Step S15 is completed, and a series of the order processing ends.

As is apparent from the above description, in the drive-through system 1 according to an embodiment, the vehicle 40 receives, from each occupant, operation to select a product to be purchased in the drive-through service, generates order information indicating the product selected by the occupant, and transmits the generated order information to the store terminal 50, the store terminal 50 generates, by using the received order information, settlement information for each occupant for performing settlement processing of the product, and transmits the generated settlement information to the vehicle 40, the vehicle 40 displays the settlement information of each occupant, and the user terminal 30 executes the settlement processing of the product with the wallet server 10 by using the settlement information of the corresponding occupant. According to such a configuration, group settlement may be easily performed, so that convenience of a settlement service in a drive-through may be improved.

According to the present disclosure, convenience of a settlement service in a drive-through may be improved.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A drive-through system comprising:
a store terminal device provided in a store providing a drive-through service and comprising a first processor comprising hardware;
a vehicle comprising
a display, and
a second processor comprising hardware; and
a plurality of user terminal devices, each of which is carried by a respective one of a plurality of occupants riding in the vehicle, each user terminal device comprising a third processor comprising hardware, wherein
the second processor is configured to
receive, from each occupant, operation to select a product to be purchased in the drive-through service,
generate order information indicating the product selected by the occupant, and
output the generated order information to the store terminal device,
the first processor is configured to
acquire the order information,
generate, by using the acquired order information, settlement information for each occupant for performing settlement processing of the product, and
output the generated settlement information to the vehicle,
the second processor is further configured to
acquire the settlement information, and
display the settlement information of each occupant on the display, and
the third processor is configured to
execute the settlement processing of the product by using the settlement information of the occupant displayed on the display.

2. The drive-through system according to claim 1, wherein the second processor is configured to
generate the order information for each occupant, and
output the generated order information for each occupant to the store terminal device.

3. The drive-through system according to claim 1, wherein the order information includes information regarding the product selected by each occupant.

4. The drive-through system according to claim 1, wherein the settlement information includes a two-dimensional code for settlement processing.

5. The drive-through system according to claim 1, wherein the settlement information includes a barcode for settlement processing.

6. The drive-through system according to claim 1, wherein the third processor is configured to execute settlement processing of a product by electronic money payment.

7. The drive-through system according to claim 1, wherein the third processor is configured to execute settlement processing of a product by scan payment.

8. The drive-through system according to claim 1, wherein the third processor is configured to execute settlement processing of a product by code payment.

9. The drive-through system according to claim 1, wherein the third processor is configured to execute settlement processing of a product via a settlement application program.

* * * * *